United States Patent
Watanabe et al.

(10) Patent No.: US 7,235,226 B2
(45) Date of Patent: Jun. 26, 2007

(54) METHOD FOR GENERATING HYDROGEN GAS UTILIZING ACTIVATED ALUMINUM FINE PARTICLES

(75) Inventors: Masao Watanabe, Shiraoi (JP); Ximeng Jiang, Chitose (JP); Ryuichi Saito, Chitose (JP)

(73) Assignees: Dynax Corporation, Chitose-shi (JP); Muroran Institute of Technology, Muroran-shi (JP)

( * ) Notice: Subject to any disclaimer, the term of this patent is extended or adjusted under 35 U.S.C. 154(b) by 181 days.

(21) Appl. No.: 11/197,782

(22) Filed: Aug. 4, 2005

(65) Prior Publication Data
US 2006/0034756 A1 Feb. 16, 2006

(30) Foreign Application Priority Data
Aug. 5, 2004 (JP) ............................. 2004-229172

(51) Int. Cl.
*C01B 3/08* (2006.01)
*C01B 3/10* (2006.01)
*C22B 21/00* (2006.01)

(52) U.S. Cl. ......................................... 423/657; 75/671
(58) Field of Classification Search ................. 423/657
See application file for complete search history.

(56) References Cited

U.S. PATENT DOCUMENTS 4,072,514 A * 2/1978 Yasaka ........................ 420/402
6,506,360 B1 * 1/2003 Andersen et al. ........... 423/657
6,536,551 B1   3/2003 Tanaka et al.
6,638,493 B2 * 10/2003 Andersen et al. ........... 423/657
7,008,609 B2 * 3/2006 Watanabe et al. ........... 423/657
2002/0127440 A1   9/2002 Yamamoto et al.

FOREIGN PATENT DOCUMENTS

JP   2001-119815   4/2001
JP   2001-143714   5/2001
JP   2002-270209   9/2002

OTHER PUBLICATIONS

Matsuyama, Masao et al, "Hydrogen Production from water using waste aluminum", Toyama Daigaku Suiso Doitai Kino Kenkyu Senta Kenkyu Hokoku, 12, 49-58 (English) 1992. (no month).*
Abstract of JP2001-143714, Inventors: Yoshitake Masaru et al., Applicant: Asahi Glass Co Ltd., Application No. JP199903-19997, 19991110, no month.

* cited by examiner

*Primary Examiner*—Wayne A. Langel
(74) *Attorney, Agent, or Firm*—Howson & Howson LLP

(57) ABSTRACT

By activating aluminum fine particles obtained by milling aluminum alloy in water, reactivity of the aluminum fine Particles at low temperature is improved. The activation comprises a thermal shock treatment wherein the aluminum fine particles are repeatedly heated and cooled down rapidly, and subsequently these activated aluminum fine particles are stored in a refrigerator. By reaction between the activated aluminum fine particles and water molecules, a large amount of hydrogen gas can be generated at room temperature, therefore hydrogen gas or fuel for a portable-type fuel cells can be produced in large quantities at room temperature in a short period of time.

3 Claims, 3 Drawing Sheets

Amount of hydrogen generated per 5g of aluminum fine particles

METHOD FOR GENERATING HYDROGEN GAS UTILIZING ACTIVATED ALUMINUM FINE PARTICLES

FIELD OF THE INVENTION

The present invention relates to a method for generating hydrogen gas which can provide hydrogen gas to a miniature fuel cell or a polymer electrolyte fuel cell (PEFC) at room temperature. The present invention uses fine particles of aluminum or aluminum alloy, which react with water molecules and produce hydrogen gas, and for these materials aluminum chips (curls) or industrial wastes from automobile factories are recycled. Accordingly, the present invention also relates to an environmental protection issue on disposal of aluminum cutting chips, as well as a technology of new energy source.

PRIOR ART

A polymer electrolyte fuel cell (PEFC) uses hydrogen as its fuel. Conventionally, methods for decomposing organic molecules such as alcohol, natural gas and gasoline have been explored as methods for generating and providing gas required for fuel cells. While such methods are suitable for mass production of hydrogen gas, there are also a number of problems, for example, hydrogen treating at hundreds of degrees Celsius is required; byproducts such as $CO_2$ and carbon can be generated; and a large facility and heat resource are required. In addition, while a photocatayst method, which decomposes water molecule at low temperature utilizing sunlight, is an excellent method, there are also problems such as large area to receive sunlight is required and generation of hydrogen is rather slow.

A method for obtaining hydrogen gas is a crucial technical issue for a portable-type miniature fuel cell. In order to operate a portable-type fuel cell, it is necessary to provide 1 ml/sec(3.6 l/h) of hydrogen gas at room temperature. For this purpose, the ability to produce necessary amount of hydrogen gas when power is to be generated, is highly important. In practical use of a portable-type fuel cell, it is not appropriate from a safety standpoint to carry about a large amount of hydrogen gas filled in a cylinder etc.

As a method for generating hydrogen used for a portable-type fuel cell, a direct-methanol fuel cell wherein hydrogen and carbon dioxide gas are obtained by reacting methanol with water by injecting methanol directly into hydrogen electrode of the fuel cell, has been explored. The fuel cells of this type are disclosed in a number of documents, namely, Unexamined Japanese Patent Publication No. 270209/2002; Unexamined Japanese Patent Publication No. 143714/2001; and Unexamined Japanese Patent Publication No. 119815/2001.

However, a direct-methanol fuel cell has a number of problems, for example, methanol permeates through an electrolyte membrane; and 200 degrees Celsius of catalytic reaction temperature is required for methanol decomposition, therefore, many technical problems make its practical use unrealistic.

Since a portable-type fuel cell demands its operation and supply of hydrogen gas to be conducted at low temperature (room temperature), it is difficult for a direct methanol fuel cell to produce hydrogen gas which meets satisfactory standards of a fuel for a portable-type fuel cell, and therefore a new hydrogen source is on demand to replace these means.

SUMMARY OF THE INVENTION

In view of the above problems, it is an object of the present invention to provide a method for generating hydrogen gas, which can generate a large amount of hydrogen gas as a fuel for a portable-type fuel cell at room temperature in a short time.

The present invention solved the above-mentioned problems by providing a method for generating hydrogen gas, characterized in that a thermal shock treatment by way of activation of aluminum particles, comprising a step of heating aluminum particles obtained by milling aluminum or aluminum alloy material from room temperature to a predetermined temperature with the temperature-rising speed wherein microcracks and/or nanocracks are generated inside crystals of said aluminum particles; and a step of cooling said aluminum particles down to a predetermined temperature with the temperature-falling speed wherein microcracks and/or nanocracks are generated inside crystals of said aluminum particles, is repeated twice or more; and hydrogen gas is generated by reacting said aluminum particles with water molecules at room temperature.

Preferably, when activating said aluminum particles, the heating temperature of said aluminum particles is 40 to 80 degrees Celsius, and the cooling temperature is not more than 10 degrees Celsius.

According to the present invention, since the reactivity at low temperature of the aluminum fine particles can be improved by activating aluminum fine particles, a large amount of hydrogen gas can be generated at room temperature, particularly at low temperature such as 5 to 15 degrees Celsius.

Therefore, according to the present invention, hydrogen gas can be easily and safely supplied to a portable-type miniature fuel cell, which operates at room temperature.

DETAILED DESCRIPTION OF A PREFERRED EMBODIMENT

Figure 1:
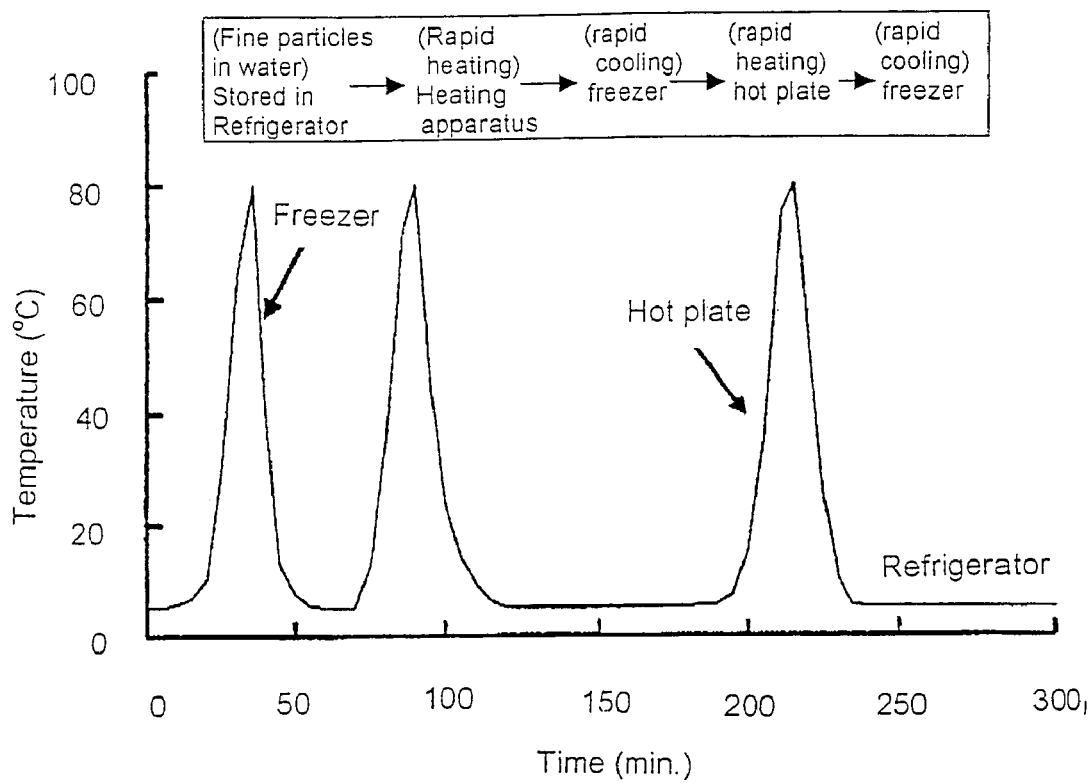
FIG. 1 is a graph showing the temperature and the time of activation of aluminum fine particles.

The present invention will be explained in details below.

Aluminum is a metal which has high reactivity with water molecules, however, decomposition of water molecule rarely occurs since its surface is covered with oxide. Its chemical reaction is rather simple.

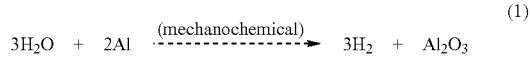

$$3H_2O + 2Al \xrightarrow{\text{(mechanochemical)}} 3H_2 + Al_2O_3 \quad (1)$$

Formula (I) is an exothermic reaction when reaction heat of formation is 680 kcal/mol, and the reaction is hastened rapidly as the temperature rises. In order for this reaction to be continuously performed, a special method is required. The inventors of the present invention have already disclosed in Japanese Patent Application No. 304105/2003, the method for producing said reactions continuously by adopting a mechanism of mechanochemical corrosion reaction (degradation and decomposition of materials caused by water) based on a mechanical frictional destruction of aluminum alloy fine particles. The technical details of said mechanism are described in Japanese Patent Application No. 304105/2003, but in summary, its principle is to expand surface reaction of aluminum fine particles and water to bulk reaction of entire particles.

Since the materials for aluminum fine particles are chips (curls) of aluminum alloy or industrial wastes, disposed from manufacturing automobile engines, they can be purchased at very low cost. In addition, this aluminum alloy comprises 6% of Si, and thus it is harder and more fragile than pure aluminum and it can be easily turned into fine particles.

Aluminum or aluminum alloy materials, which are milled and turned into fine particles in water, moderately decompose water molecules at room temperature in water and generate hydrogen gas. In this connection, the room temperature mentioned repeatedly in the present specification is in the range of 5 to 35 degrees Celsius, as stipulated in JIS K 0050.

This reaction of the aluminum fine particles and water molecules is highly influenced by temperature, and when the temperature is 40 to 80 degrees Celsius, intense evolution reaction of hydrogen gas begins, and a large amount of hydrogen gas can be produced. In order for the aluminum fine particles to cause intense reaction of "water molecule decomposition" and "hydrogen gas generation" at room temperature, a special method for activation is required.

The nature of decomposition reaction of water molecules is to generate micro/nano cracks inside crystals of the aluminum fine particles (the diameter of which are 5-50 micrometers) in the process of milling aluminum materials, and propagate throughout the particles. Water molecules penetrate inside cracks generated, and reaction occurs to decompose water molecules and to generate aluminum hydride etc.

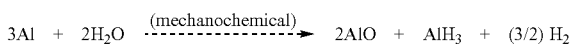

(2)

When hydrogen generation reaction begins, the reaction of formula (2) is accelerated due to its reaction heat, and consequently, entire particles start hydrogen generation reaction at once. By applying this phenomenon, rapid hydrogen generation reaction can be realized at room temperature.

According to the present invention, by applying rapid heating and cooling repeatedly to the aluminum fine particles, in other words, by conducting a "thermal shock treatment", the distribution of micro/nano cracks inside the aluminum fine particles can be made dense. "Thermal shock" means that a thermal stress is rapidly applied to objects in a fairly wide temperature range.

By performing this activation of aluminum fine particles, a larger amount of hydrogen can be continuously generated in a short time, than when the method for generating hydrogen disclosed in Japanese Patent Application No. 304105/2003 is used.

The procedures of activation of aluminum fine particles will be explained below.

First of all, chips of aluminum alloy are milled using a stone-mill-type mill in the water to produce aluminum alloy fine particles, the diameter of which are 5 to 50 micrometers. This aluminum milling process is conducted in a similar manner as that disclosed in Japanese Patent Application No. 304105/2003, using the same apparatus used therein.

During the milling process, numerous cracks of micro/nano sizes are generated inside crystals of the aluminum fine particles. The aluminum fine particles are separated according to their sizes using a sieve in water, and are stored in a refrigerator set at about 5 degrees Celsius, or a freezer set at 0 degree Celsius or below. Although the aluminum fine particles slowly generate hydrogen at the temperature around 20 degrees Celsius (at the speed of about 0.1 ml/min), it cannot be adopted for practical use.

A glass container holding the aluminum fine particles in the water therein is moved onto a hot plate, and it is heated rapidly thereon. At this point, it is heated from room temperature to a predetermined temperature with the temperature-rising speed wherein microcracks and/or nanocracks are generated inside crystals of the aluminum fine particles. Preferably, the temperature-rising speed is 1 degree Celsius per minute or more, and the heating temperature is in the range of 40 to 80 degrees Celsius. In this condition, the aluminum fine particles accelerate the reaction with water, and the generation of hydrogen gas becomes remarkable.

In the condition where the generation of hydrogen gas became intense, aluminum fine particles together with the glass container are put in a freezer to be cooled rapidly. At this point, it is cooled down to a predetermined temperature with the temperature-falling speed wherein microcracks and/or nanocracks are generated inside crystals of the aluminum fine particles. Preferably, the temperature-falling speed is at least 5 degrees Celsius per minute, and the cooling temperature is not more than 10 degrees Celsius.

It is considered that the thermal shock treatment is effective for activation of aluminum fine particles, when the temperature difference between heating and cooling temperatures is 50 degrees Celsius or more.

After conducting said thermal shock treatment, the glass container is taken out of the freezer before the temperature inside reaches 0 degree Celsius.

When bringing the glass container back to room temperature after conducting said thermal shock treatment cycle twice or more, a large amount of hydrogen gas can be generated.

Furthermore, by repeating said thermal shock treatment cycle once or more, a large amount of hydrogen generating reaction can be realized at temperature as low as 0 to 5 degrees Celsius.

The temperature and time for activation (in case where aluminum fine particles weigh 50 g) are shown in FIG. 1.

Figure 2:
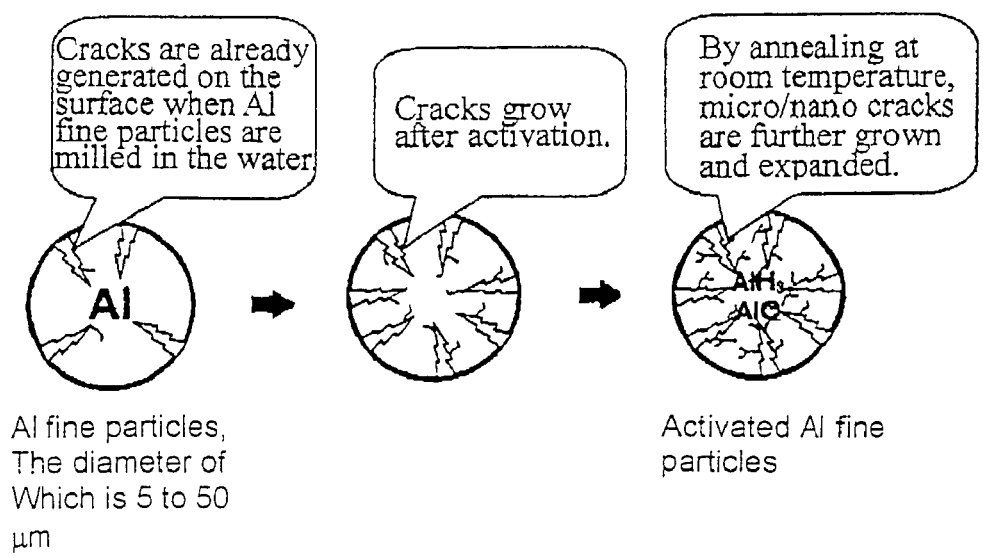
FIG. 2 is a scheme showing the changes of aluminum fine particles caused by activation.

By conducting said activation, generation and growth of microcracks occur inside the aluminum fine particles at a high temperature and generation and growth of nanocracks occur within aluminum fine particles at a low temperature and therefore, it is considered that generation and accumulation of aluminum hydride occur throughout the aluminum fine particles. The condition change in this connection is schematically shown in FIG. 2. The important concept is that $AlH_3$ and $AlO$ which are generated in crack section, causes cubical expansion as alien substances of aluminum crystals, which leads to generation of more cracks, and consequently cracks are spread throughout the aluminum fine particles.

EXAMPLES

The present invention is explained in details by examples below. It is to be noted that the present invention is not limited to these examples.

Example 1

Figure 3:
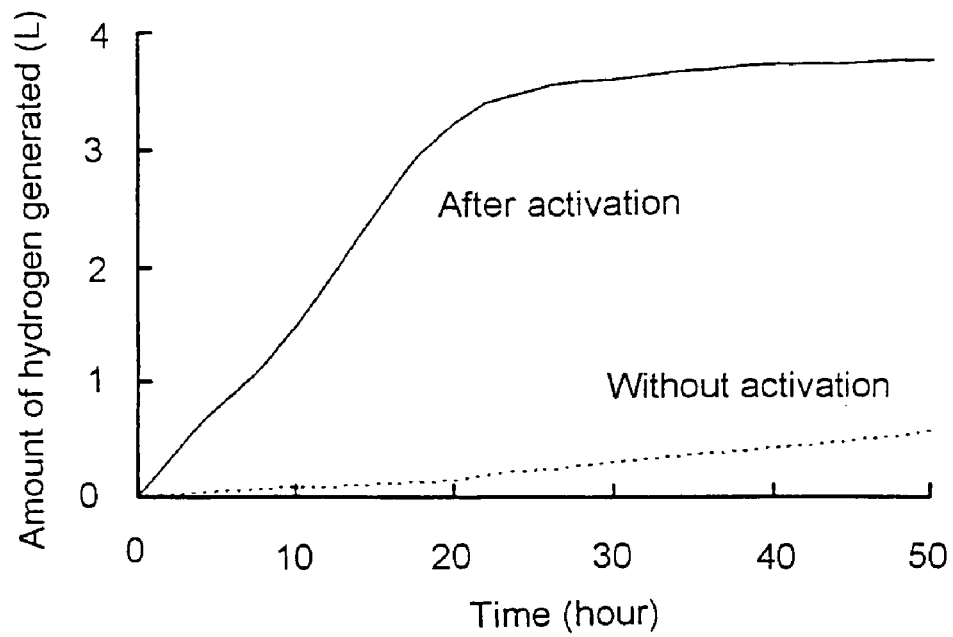
FIG. 3 is a graph showing the amount of hydrogen generated per 5 g of aluminum fine particles.

FIG. 3 shows the amount of hydrogen generated per 5 g of aluminum fine particles, by reacting with water molecules at room temperature (20 degrees Celsius). A solid line in the figure indicates aluminum fine particles which are activated by conducting the thermal shock treatment cycle three times with the temperature range of −10 to 60 degrees Celsius, while a broken line indicates aluminum fine particles which are not activated. When comparing activated aluminum fine particles and non-activated aluminum fine particles, remarkable difference can be seen in the ability to generate hydrogen gas at room temperature.

Example 2

Figure 4:
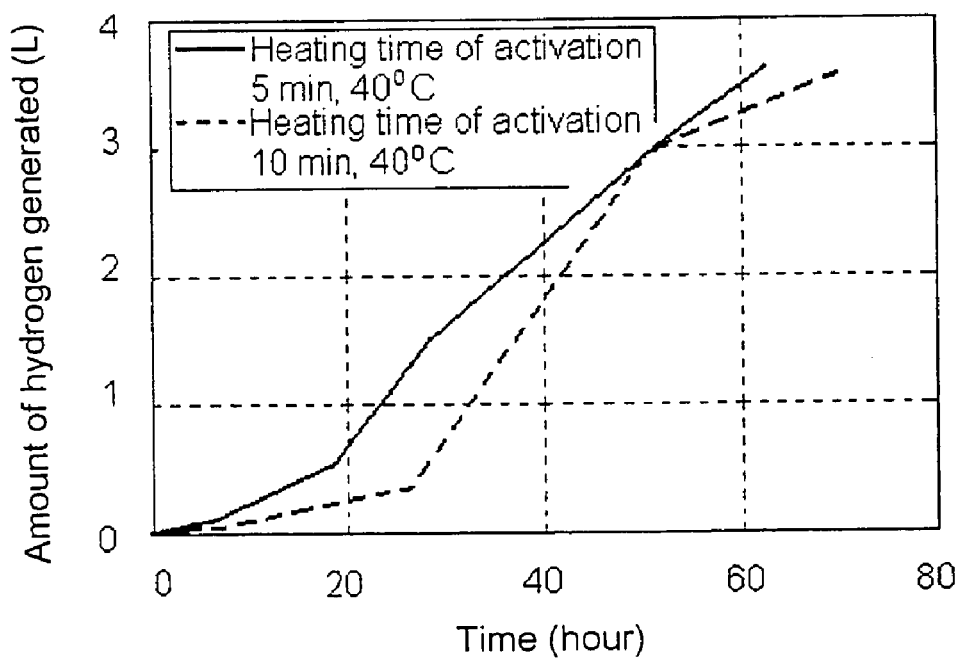
FIG. 4 is a graph showing the amount of hydrogen generated per 4.5 g of aluminum fine particles, measured every heating hours of activation.

FIG. 4 shows the hydrogen generation property of aluminum fine particles measured by heating time, when said aluminum fine particles and water molecules are reacted at room temperature (20 degrees Celsius) after conducting activation which repeats the thermal shock treatment to 4.5 g of aluminum fine particles with the temperature range of −20 to 40 degrees Celsius three times. A solid line in the figure indicates the amount of hydrogen generated when temperature was raised to 40 degrees Celsius in 5 minutes, while a broken line indicates the amount when temperature was raised to 40 degrees Celsius in 10 minutes. According to FIG. 4, when heating was performed up to 40 degrees Celsius in 5 minutes, much more cracks occur inside the aluminum fine particles in comparison with when heating was performed in 10 minutes, therefore, a large amount of hydrogen can be generated in a short time.

Example 3

Figure 5:
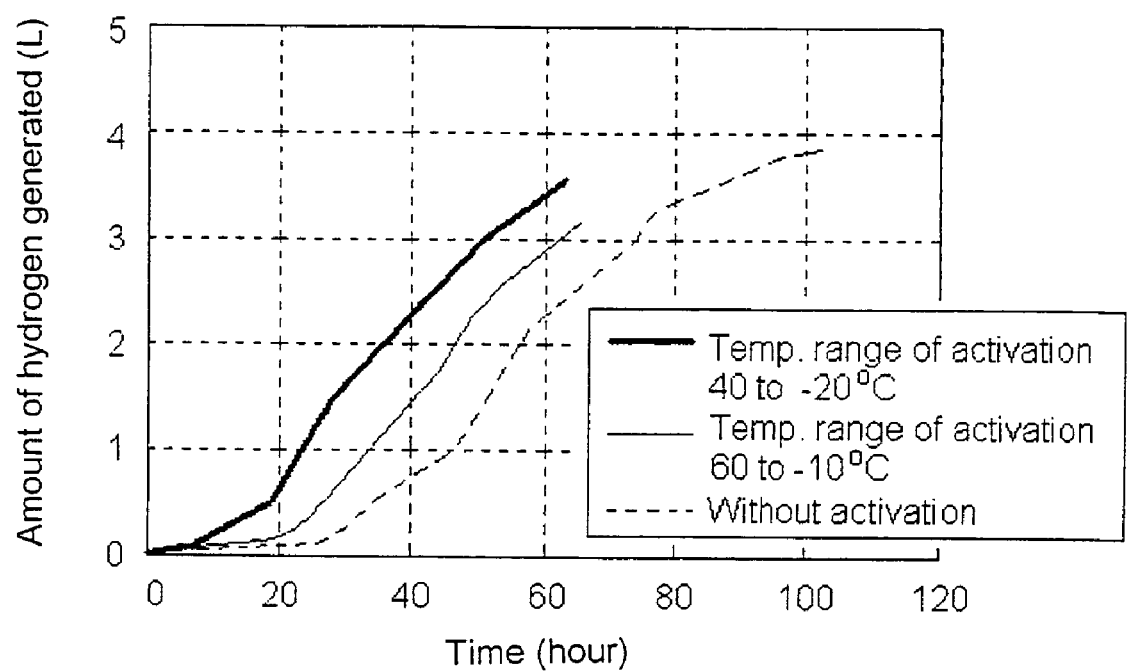
FIG. 5 is a graph showing the amount of hydrogen generated per 4.5 g of aluminum fine particles, measured by temperature ranges of activation.

FIG. 5 shows the hydrogen generation property for aluminum fine particles measured by the temperature ranges, when said aluminum fine particles and water molecule are reacted at room temperature after conducting activation which repeats the thermal shock treatment three times to 4.5 g of the aluminum fine particles. A bold line in the figure shows the amount of hydrogen generated when the thermal shock treatment was conducted with the temperature range of −20 to 40 degrees Celsius, a solid line indicates when the thermal shock treatment was conducted with the temperature range of −10 to 60 degrees Celsius, and a broken line is when activation was not conducted. According to FIG. 5, it can be seen that aluminum fine particles when the thermal shock treatment was conducted with the temperature range of −20 to 40 degrees Celsius have better reactivity with water and generate hydrogen in a short time in comparison with other two examples. It is considered that this is because the lower the temperature is, the more micro and nano cracks spread all over the inside of the aluminum fine particles.

In addition, in the example with the temperature range of −20 to 40 degrees Celsius shown in a bold line and in the example with the temperature range of −10 to 60 degrees Celsius shown in a solid line, hydrogen is generated in a short time in comparison with the case where activation is not conducted, and thus the amount of hydrogen generated is not measured 60 hours after activation was conducted.

Hydrogen gas produced by the present invention was analyzed using a quadrupole mass analyzer. As a result, generation of impurities such as $O_2$ and $CO_2$ was within an acceptable error range, and it was verified to be at least 99% pure hydrogen gas.

When the aluminum fine particles of before and after conducting the thermal treatment cycles are analyzed and compared by X-ray diffraction (XRD), the broadening of diffraction lines can be observed as hydrogen atom is accumulated in aluminum metal. It was observed that a half-width of aluminum crystal (200) diffraction line is 1.4%. Since the size of hydrogen atom is small, expansion effect at small extent is expected. When the fine particles, which are intensely generating hydrogen gas at room temperature, are taken out (and dried) to conduct crystal analysis, the start of generation of amorphous alumina and hydroxyl aluminum can be seen along with expansion of line width. In the X-ray diffraction pattern after reaction of hydrogen generation, remarkable generation of hydroxyl aluminum and amorphous alumina was observed.

As discussed above, the present invention can generate more hydrogen gas at room temperature than conventional method, by conducting said activation to aluminum fine particles obtained by milling aluminum chips in water.

Furthermore, the reactivity of the aluminum fine particles at low temperature can be improved by repeatedly conducting said activation, and as a result, a large amount of hydrogen generation reaction can be made possible at the low temperature of 0 to 5 degrees Celsius.

According to the present invention, a large amount of hydrogen gas can be easily and safely generated in a short period of time, and therefore, it can be adopted as a new hydrogen source for fuel cells operated at room temperature.

The invention claimed is:

1. A method for generating hydrogen gas, characterized in that a thermal shock treatment by way of activation of aluminum particles, comprising a step of heating aluminum particles obtained by milling aluminum or aluminum alloy material from room temperature to a predetermined temperature with the temperature-rising speed wherein microcracks and/or nanocracks are generated inside crystals of said aluminum particles; and a step of cooling said aluminum particles down to a predetermined temperature with the temperature-falling speed wherein microcracks and/or nanocracks are generated inside crystals of said aluminum particles, is repeated twice or more; and hydrogen gas is generated by reacting said aluminum particles with water molecules at room temperature.

2. A method for generating hydrogen gas as claimed in claim 1, wherein the heating temperature of said aluminum particles is 40 to 80 degrees Celsius during the activation of said aluminum particles.

3. A method for generating hydrogen gas as claimed in claim 1, wherein the cooling temperature of said aluminum particles is not more than 10 degrees Celsius during the activation of said aluminum particles.

* * * * *